UNITED STATES PATENT OFFICE.

SANFORD HILL WOOD, OF LOS ANGELES, CALIFORNIA.

CELLULOID.

1,364,342.     Specification of Letters Patent.     Patented Jan. 4, 1921.

No Drawing.     Application filed May 16, 1919. Serial No. 297,671.

*To all whom it may concern:*

Be it known that I, SANFORD HILL WOOD, a citizen of the United States, residing at Los Angeles, county of Los Angeles, and State of California, have invented a new and useful Incombustible and Non-Inflammable Plastic Film Substance—Celluloid— of which the following is a specification.

*Object.*—The object of my invention is the production of a hetero (different) plastic non-inflammable, fire proof, non-heating, non-combustible, transparent film composition to be applied to the use of the kineto-camera, for receiving photograph negative pictures for printing upon the positive film. My positive film is made so by the application of the customary silver-bromid sensitizing reagents, emulsionized also as usual for preparing plates and films for exposure to acquire the moving object sought to affix.

*Uses.*—My film is designed especially for the fixing and transfixing of moving objects, animatization, etc., for the reproduction at will through the kinetoscope projection upon a suitable screen.

*Composition.*—My composition consists of a mixture, *secundem artem*, of pyroxylin prepared, and prepared from soft, pure white paper, in sheets preferably because of greater ease in manipulation than is that (pyroxylin) prepared of cotton wool fiber, or other fibrous materials.

*Identity of matter.*—With my selected base converted into pyroxylin, I prefer to compound same into film tissue as follows: pyroxylin 10 parts, acetone 5 parts, alcohol (96 P. C.) 6 parts, naphthalene 1 part, ferric chlorid 3 parts, gelatin 5 parts, tetrachlormethane ($CCl_4$) 7 parts, all by weight.

*Procedure.*—It is first necessary to dissolve the pyroxylin in the acetone with heating and stirring (or agitation); during this stirring period, of about six minutes, the gelatin is added. After these have become swollen up, they must be removed from the vessel (which should be of porcelain, or so lined) and transferred into some other vessel and thoroughly washed with water until blue litmus is not changed to red, (neutral.) This plastic mass is placed into any suitable container, the methyl alcohol (96 P. C.), naphthalene, ferric chlorid, and tetrachlormethane added in the order named, and well incorporated by beating or stirring continuously until a dense or heavy syrupy semi-fluid mass results, and now pour into previously improvised molds and pressed; or may be further diluted with the solvents (acetone and alcohol), and poured upon glass plates to form layers, either of which method used requiring careful attention. The dried film tissue must be carefully lifted from the molds or glass plates, washed in water and dried on the surface, and immediately passed through bright clean steel rolls so superimposed as to apply uniform pressure to the tissue; either the superior or inferior roll must be kept at about 150° Fah. burnishing and reducing the tissue to uniformity of attenuation required to pass through the traveling mechanism of the modern kinetoscope. My film tissue when taken from the rolls is then cut into the standard film tape dimensions, removed to regulation perforation machine, perforated and reeled.

*Completion.*—When treated according to this specification a film will result not requiring an abrasive for "leveling down" inequalities of surface unevenness. It is now a light flexible film tape, not easily torn, scratched, split, cracked; is water-proof, and not easily damaged.

*Result.*—Preserving its integrity indefinitely; and, as a whole entirely possesses in a high degree, all the desirable properties of a film for moving picture kinetoscopic purposes.

I claim:

1. A plastic, incombustible, transparent compound suitable for film tape for the use of the kineto-camera and kinetoscope, comprising pyroxylin, naphthalene, ferric chlorid and gelatin.

2. A plastic, incombustible, transparent compound suitable for film tape for the use of the kineto-camera and kinetoscope, comprising the following ingredients and in the proportions stated by weight: pyroxylin 10 parts, naphthalene 1 part, ferric chlorid 3 parts, and gelatin 5 parts.

3. A process of producing a plastic, incombustible, transparent compound suitable for film tape for the use of the kineto-camera and kinetoscope, comprising dissolving pyroxylin in acetone, adding gelatin thereto, washing the mixture with water until the re-action is neutral, then adding methyl alcohol, naphthalene, ferric chlorid and tetrachlormethane.

4. A process of producing a plastic, incombustible, transparent compound suitable for film tape for the use of the kinetocamera and kinetoscope, comprising mixing pyroxylin and acetone, heating and agitating the mixture and adding gelatin thereto and continuing the agitation until the mixture is homogeneous, washing the mixture with water until the re-action is neutral, adding methyl alcohol, naphthalene, ferric chlorid and tetrachlormethane in the order named.

SANFORD HILL WOOD.